US006574370B1

(12) United States Patent
Kazayama et al.

(10) Patent No.: US 6,574,370 B1
(45) Date of Patent: Jun. 3, 2003

(54) IMAGE ENCODING SYSTEM

(75) Inventors: Masahiro Kazayama, Tokyo (JP); Tadashi Kasezawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/463,596

(22) PCT Filed: Jul. 22, 1998

(86) PCT No.: PCT/JP98/03277

§ 371 (c)(1),
(2), (4) Date: Jan. 28, 2000

(87) PCT Pub. No.: WO00/05899

PCT Pub. Date: Feb. 3, 2000

(51) Int. Cl.$^{7}$ .................................................. G06K 9/36
(52) U.S. Cl. ....................................................... 382/236
(58) Field of Search ................................ 382/232, 236, 382/238, 240, 242, 248, 250; 341/51, 63, 65, 67, 107; 348/384.1, 394.1, 395.1, 400.1–404.1, 407.1–416.1, 420.1, 421.1, 425.2, 430.1, 431.1; 375/240.23, 240.24; 364/724.011, 724.04, 724.05, 724.13, 724.14, 725.01, 725.02

(56) References Cited

U.S. PATENT DOCUMENTS

| | | | | | |
|---|---|---|---|---|---|
| 5,801,778 A | * | 9/1998 | Ju | | 348/416 |
| 5,956,026 A | * | 9/1999 | Ratakonda | | 345/328 |
| 5,995,095 A | * | 11/1999 | Ratakonda | | 345/328 |

FOREIGN PATENT DOCUMENTS

| | | |
|---|---|---|
| JP | A 2-107086 | 4/1990 |
| JP | 2224490 | 9/1990 |
| JP | 2295288 | 12/1990 |
| JP | 6197332 | 7/1994 |
| JP | 8140098 | 5/1996 |

OTHER PUBLICATIONS

Hirohisa Jozawa et al: "Two–Stage Motion Compensation Using Adaptive Global MC and Local Affine MC," IEEE Transactions on Circuits and Systems, Feb. 1, 1997, pp. 75–85.

Panusopone et al.: "Efficient Motion Estimation for Block Based Video Compression," Acoustics, Speech, and Signal Processing, 1997, pp. 2677–2680.

Adolph D. et al.: "1.15 MBIT/S Coding of Video Signals Including Global Motion compensation," Signal Processing, vol. 3, No. 2, Jun. 1, 1991, pp. 259–274.

* cited by examiner

*Primary Examiner*—Jose L. Couso
(74) *Attorney, Agent, or Firm*—Birch, Stewart, Kolasch & Birch, LLP

(57) ABSTRACT

An image encoding system according to this invention comprises: a global motion detecting unit for detecting a motion of the whole picture screen between a reduction image of a present frame and a reduction image of a reference frame and for outputting global motion information; and an image encoding unit for performing a motion detection within a peripheral narrow retrieving range on the basis of the global motion information and for encoding an image by using a motion compensation prediction. As a result, an amount of arithmetic operation in the motion detection of the image encoding unit can be reduced.

14 Claims, 11 Drawing Sheets

FIG. 9

| | | | | |
|---|---|---|---|---|
| (1,1) | (2,1) | … | … | (m,1) |
| (1,2) | (2,2) | … | … | (m,2) |
| (1,3) | (2,3) | … | … | (m,3) |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| (1,n) | (2,n) | … | … | (m,n) |

IMAGE ENCODING SYSTEM

This application is the national phase under 35 U.S.C. §371 of PCT International Application No. PCT/JP98/03277 which has an International filing date of Jul. 22, 1998, which designated the United States of America.

TECHNICAL FIELD

This invention relates to an image encoding system in which a motion compensation prediction, typically such as MPEG 2 or the like, is used.

BACKGROUND ART

The conventional image encoding technique will be described with reference to the drawing. FIG. 11 is a block diagram showing a construction of an image encoder which uses a motion compensation prediction, for example, which is performed in an MPEG2 or the like.

In FIG. 11, reference numeral 300 denotes an image encoder; 301 an input terminal; 302 a subtracter; 303 a discrete cosine transformer (DCT); 304 a quantizer; 305 quantized data; 306 a variable length encoder; 307 variable length encoded data; 308 an inverse quantizer; 309 an inverse discrete cosine transformer (IDCT); 310 an adder; 311 a frame memory; 312 motion compensation prediction image data (reference image); further, 320 a motion detecting unit; 321 a motion vector value; and 322 a motion compensation predicting unit.

The operation of the above image encoder will now be described with reference to the drawing. FIG. 12 is a diagram showing a motion detecting range of the above conventional image encoder.

The image encoder 300, fundamentally, processes image data of one frame on a macro block unit basis. In FIG. 11, image data of one macro block of (16 pixels×16 lines) is inputted from the input terminal 301 and a difference between the inputted data and the reference image 312 to which a motion compensation prediction is performed is obtained by the subtracter 302. Discrete cosine transformation is performed by the discrete cosine transformer (DCT) 303 and the resultant data is quantized by the quantizer 304, thereby obtaining the quantized data 305. Subsequently, the variable length encoding of the quantized data 305 is executed by the variable length encoder 306 and the variable length encoded data 307 is transmitted.

The quantized data 305 is inversely quantized by the inverse quantizer 308, inverse discrete transformed by the inverse discrete cosine transformer (IDCT) 309, added to the reference image 312 to which the motion compensation prediction has been performed by the adder 310, and stored into the frame memory 311.

In the motion detecting unit 320, a motion detection is performed by the data from the frame memory 311 and the macro block data from the input terminal 301, thereby obtaining the motion vector 321. The motion compensation predicting unit 322 performs a motion compensation prediction on the basis of the motion vector 321. Further, the motion vector 321 is transmitted to the variable length encoder 306, variable length encoded, and transmitted as variable length encoded data 307.

FIG. 12 is a diagram showing a retrieving range of the conventional image encoder. In this figure, reference numeral 330 denotes a retrieved range; and 331 a final obtained motion vector.

The conventional image encoder has an extremely large amount of arithmetic operation in the motion detecting unit

320. In order to cope with an image having a large motion, it is necessary to make the retrieving range of the motion widened. When the retrieving range is widened, the amount of arithmetic operation increases according to the size of retrieving range. Recently, as compared with the present SDTV image, encoding of an HDTV image having a high resolution has often been performed. It is, however, necessary that the retrieving range is more widened as a higher resolution.

If those encoding processes are tried to realize in one chip, it is needed that an amount of arithmetic operation is reduced in the motion detecting unit 320. Therefore, when the retrieving range of the motion is intended to widen, it is necessary that precision of arithmetic operation is set to be low by decimating pixels or the like. The accurate motion cannot always be detected.

With respect to an image of pan of a camera or the like, almost the same detection result is obtained every macro block. It is sufficient to retrieve only an area peripheral to the pan of the camera. However, the whole retrieving range has been actually retrieved and there is a problem that the useless arithmetic operation is needed.

This invention has been made to solve the above mentioned problems. It is an object to acquire an image encoding system in which the amount of arithmetic operation by the motion detection can be reduced.

DISCLOSURE OF THE INVENTION

An image encoding system according to the present invention comprises: a global motion detecting unit for detecting a motion in the whole picture screen between a reduction image of a present frame and a reduction image of a reference frame and for outputting global motion information; and an image encoding unit for performing a motion detection within the peripheral narrow retrieving range on the basis of the global motion information and for encoding an image by using a motion compensation prediction.

In an image encoding system according to the present invention, the global motion detecting unit comprises: a first image reducing unit for reducing an image of the present frame; a second image reducing unit for reducing an image of the reference frame; and a motion detecting unit for performing a global motion detection between the reduction image of the present frame and the reduction image of the reference frame.

In an image encoding system according to the present invention, the first and second image reducing units filter an image of "a" pixels in the horizontal direction and "b" lines in the vertical direction (a, b: integers), perform a subsampling thereafter, and form data of one pixel, thereby performing an image reduction.

Moreover, in an image encoding system according to the present invention, the motion detecting unit performs the global motion detection, detects a partial motion of the picture screen between the reduction image of the present frame and the reduction image of the reference image, and outputs local motion information, and the global motion detecting unit further has a macro block motion deciding unit for selecting optimum motion information in a present macro block from the detected global motion information and the detected local motion information and for outputting the selected information to the image encoding unit as macro block motion information.

In an image encoding system according to the present invention, the global motion detecting unit comprises: an image reducing unit for reducing an input image; a reduction image frame memory for storing the reduced image as much as at least two or more frames; a selector for extracting the reduction image of the present frame and the reduction image of the reference frame out of the reduction images stored in the reduction image frame memory; and a motion detecting unit for performing a global motion detection between the reduction image of the present frame and the reduction image of the reference frame.

In an image encoding system according to the present invention, the image reducing unit filters an image of "a" pixels in the horizontal direction and "b" lines in the vertical direction (a, b: integers), performs a sub-sampling after that, and forms data of one pixel, thereby performing an image reduction.

Moreover, in an image encoding system according to the present invention, the motion detecting unit performs the global motion detection, detects a partial motion of the picture screen between the reduction image of the present frame and the reduction image of the reference frame, and outputs local motion information, and the global motion detecting unit further has a macro block motion deciding unit for selecting optimum motion information in a present macro block from the detected global motion information and the detected local motion information and for outputting the selected information to the image encoding unit as macro block motion information.

BRIEF DESCRIPTION OF THE DRAWINGS

FIG. 9 is diagram showing an example of a picture screen division by a local motion detection in the motion detecting unit in the global motion detecting unit of the image encoding system according to the embodiment 4 of this invention;

BEST MODE FOR CARRYING OUT THE INVENTION

Each of the embodiments of this invention will be described with reference to the drawings hereinbelow.

EMBODIMENT 1

Figure 1:
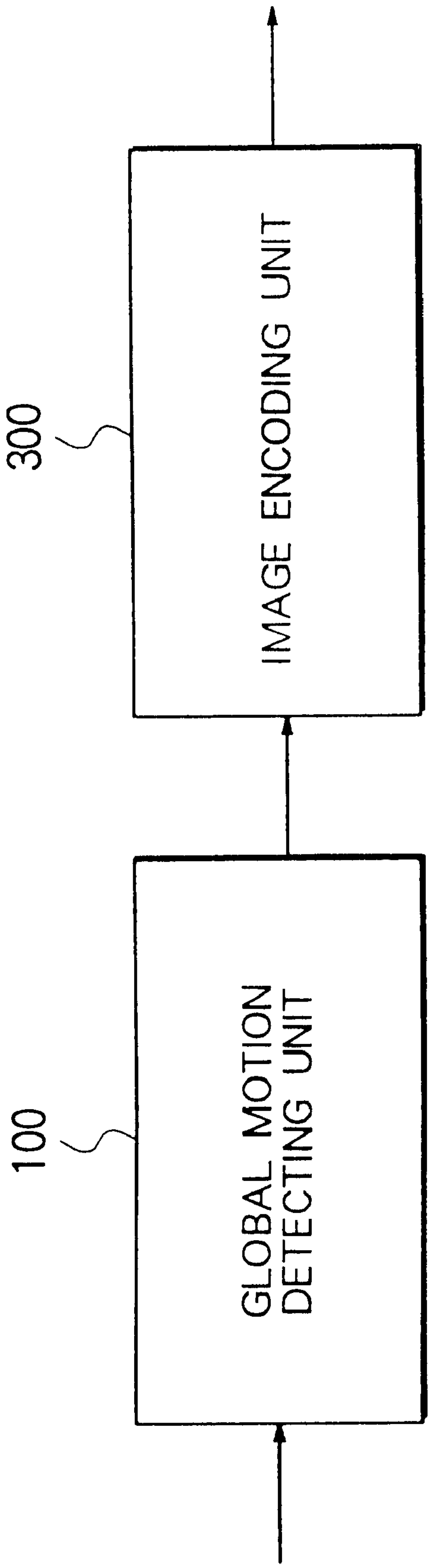
FIG. 1 is a block diagram showing the whole construction of an image encoding system according to an embodiment 1 of this invention.

An image encoding system according to the embodiment 1 of this invention will be mentioned with reference to the drawings. FIG. 1 is a block diagram showing the whole construction of the image encoding system according to the embodiment 1 of this invention. In each of the drawings, the same reference numeral indicates the same or corresponding portion.

Figure 11:
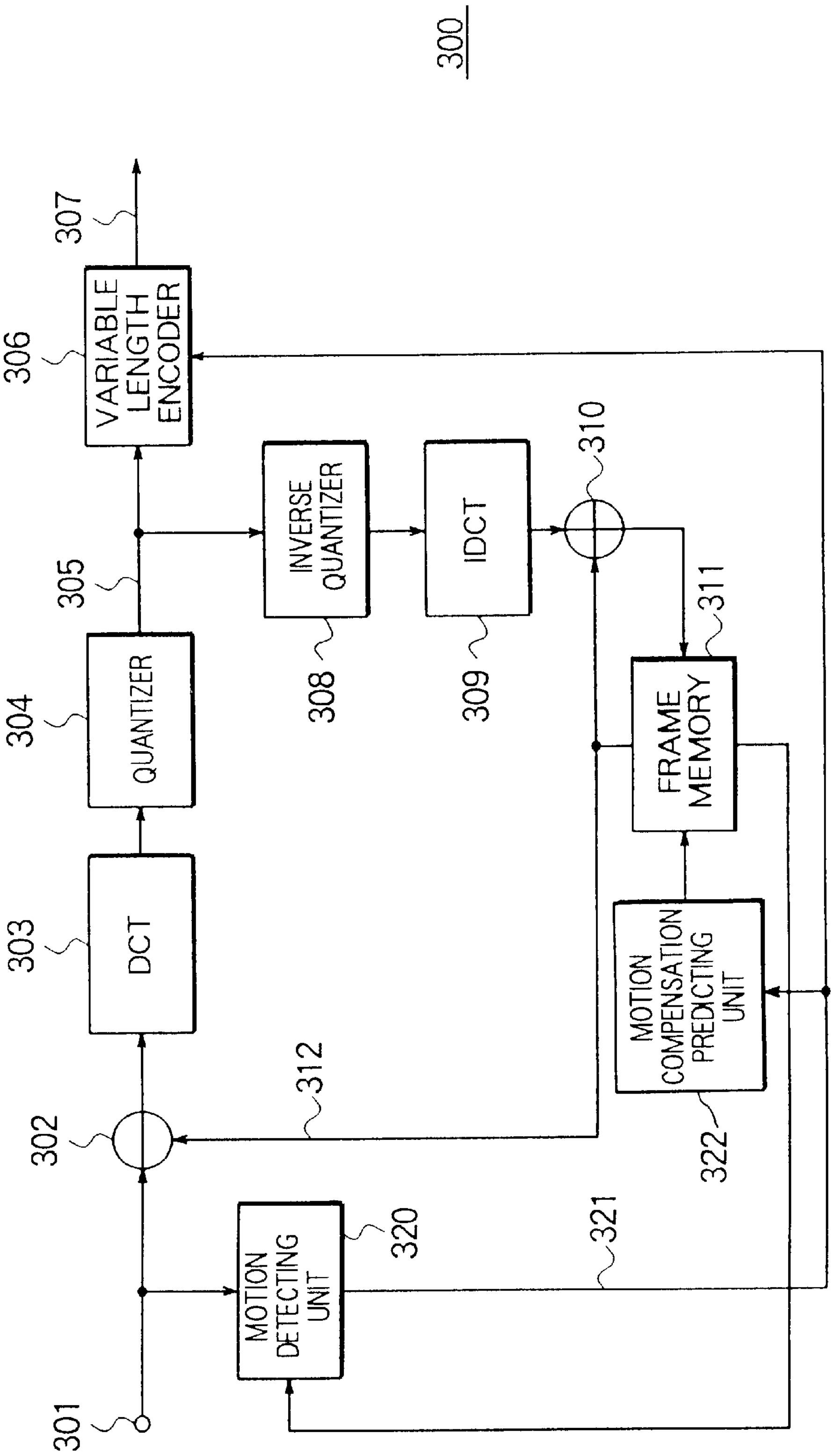
FIG. 11 is a block diagram showing a construction of a conventional image encoder.

In FIG. 1, reference numeral 100 denotes a global motion detecting unit and 300 an image encoding unit having the same construction as a conventional image encoder shown in FIG. 11.

The global motion is obtained in the global motion detecting unit 100 and encoding process is executed in the image encoding unit 300. With regard to the processes of the image encoding unit 300, almost similar processes to the conventional processes are performed.

Figure 2:
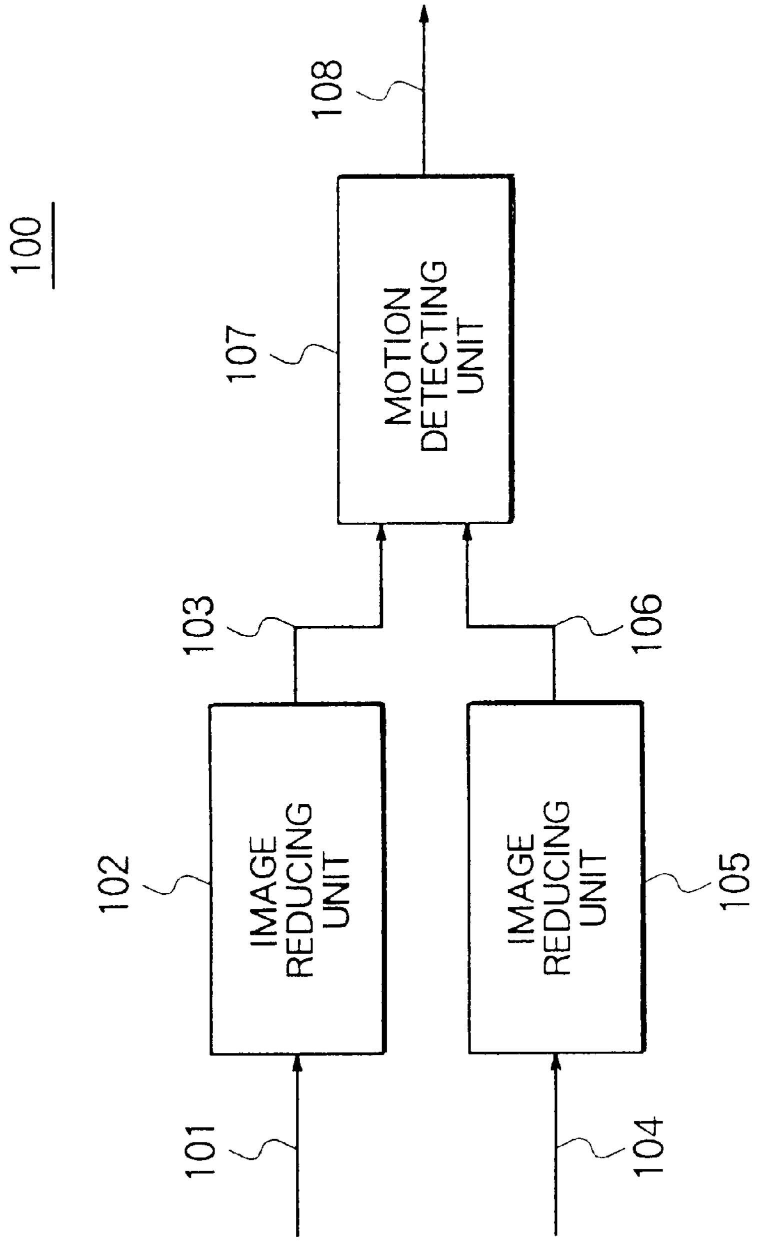
FIG. 2 is a block diagram showing a construction of a global motion detecting unit of the image encoding system according to the embodiment 1 of this invention.

FIG. 2 is a block diagram showing a construction of a global motion detecting unit of the image encoding system according to the embodiment 1 of this invention.

In FIG. 2, reference numeral 101 denotes image data of a present frame; 102 an image reducing unit; 103 a reduction image of the present frame; 104 image data, for example, of a reference frame obtained by using a frame memory (not shown); 105 an image reducing unit; 106 a reduction image of a reference frame; 107 a motion detecting unit; and 108 global motion information.

In figure, the image data 101 of the present frame is inputted to one image reducing unit 102 and the reduction image 103 of the present frame is obtained. In a similar manner, the image data 104 of the reference frame is inputted to the other image reducing unit 105 and the reduction image 106 of the reference frame is obtained. In the motion detecting unit 107, the global motion information 108 is obtained by the reduction image 103 of the present frame and the reduction image 106 of the reference frame. The global motion information 108, which is similar to the conventional one, is a vector of a value which is the smallest in the evaluation values such as a sum of differential absolute values in the present frame and reference frame or the like.

Figure 3:
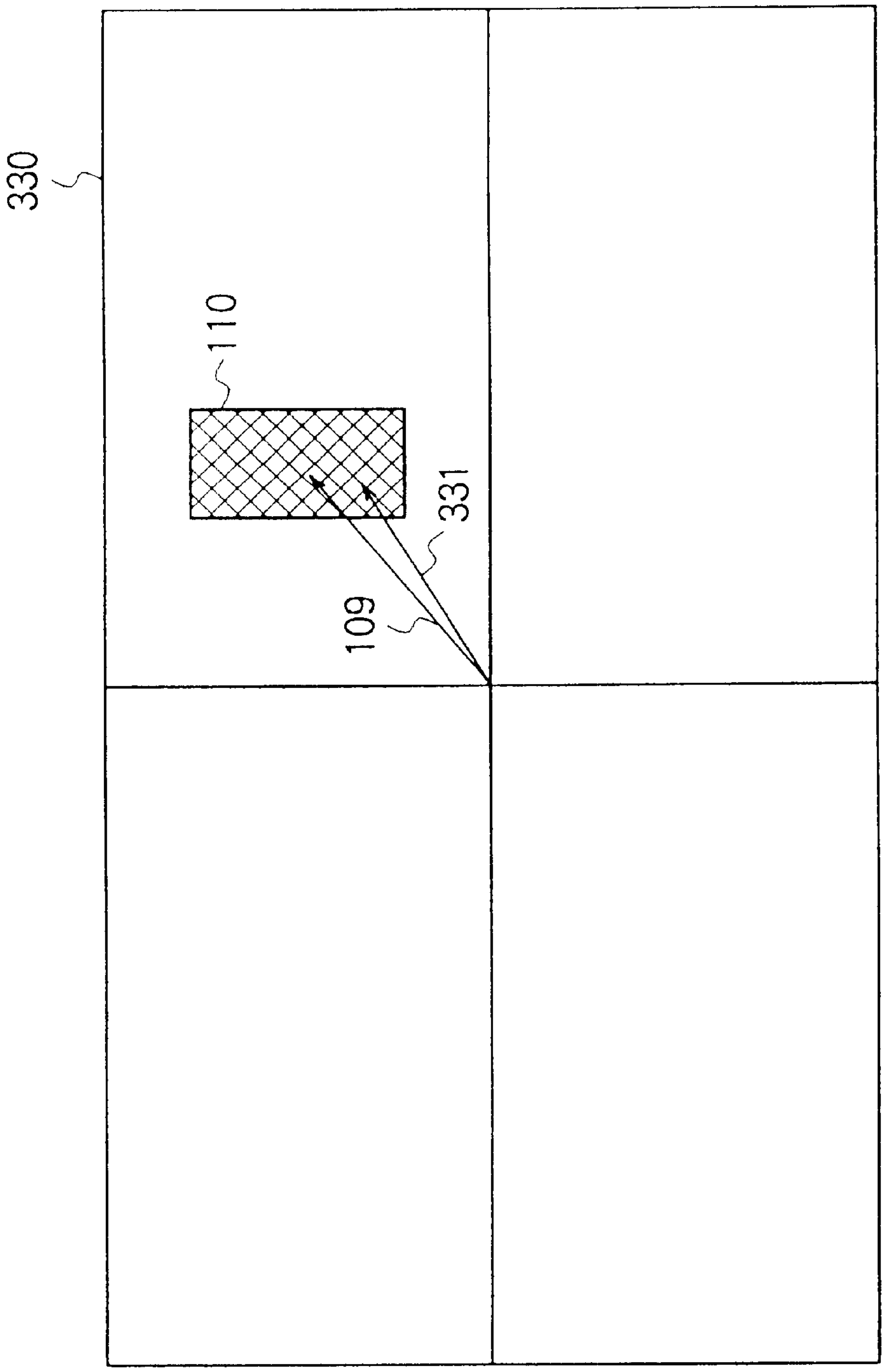
FIG. 3 is a diagram showing a motion detecting range of the image encoding system according to the embodiment 1 of this invention.
Figure 12:
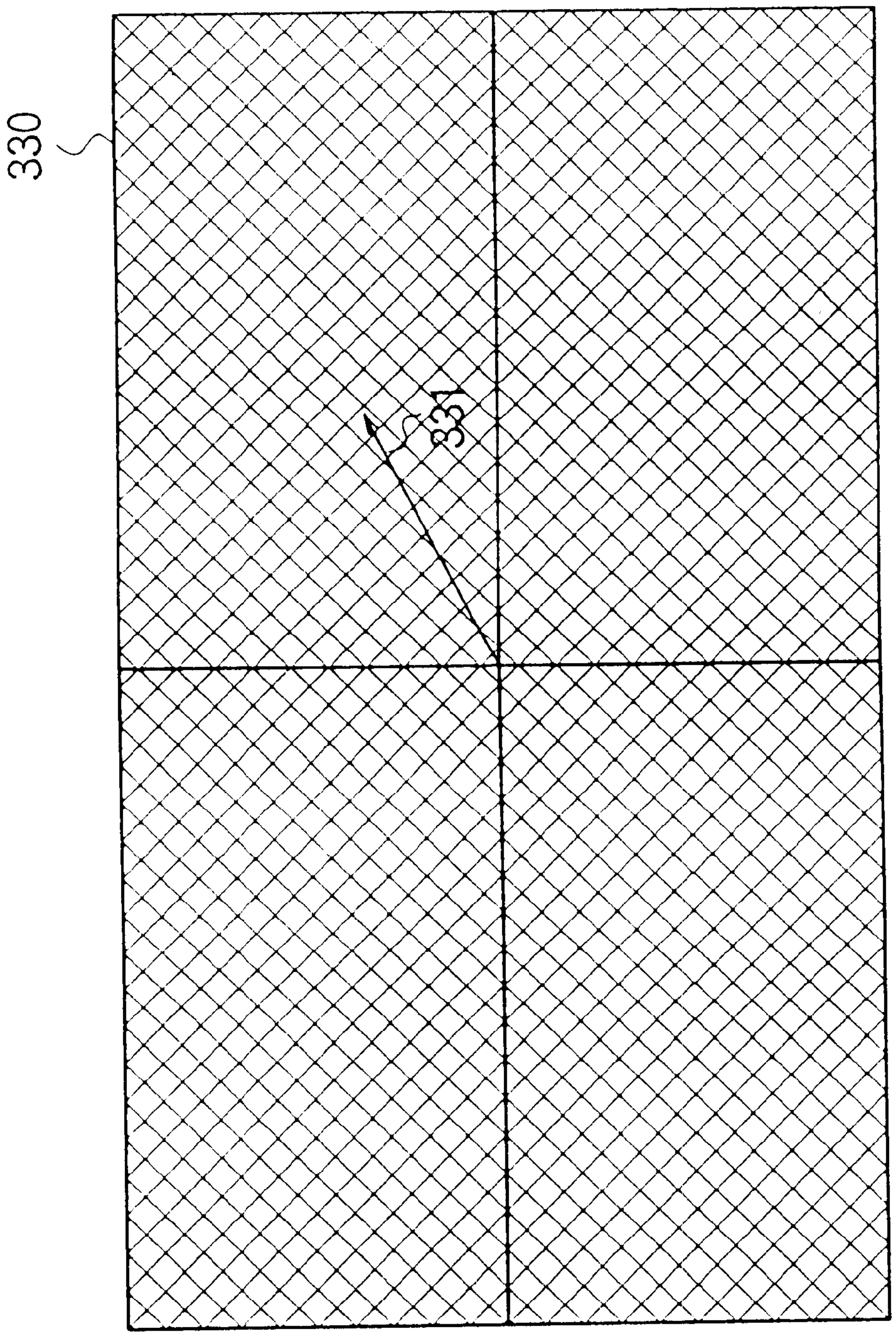
FIG. 12 is a diagram showing a motion detecting range of the conventional image encoder.

FIG. 3 is a diagram showing a retrieving range in the image encoding unit 300 in case of using the vector obtained by the global motion detecting unit 100. In this figure, reference numeral 109 denotes a motion vector which is finally obtained in the global motion detecting unit 100; 110 a retrieved range in the image encoding unit 300; 331 a motion vector which is finally obtained in the image encoding unit 300, that is, the finally obtained motion vector 331 is the same vector as a conventional one shown in FIG. 12; and 330 a retrieving range in the conventional image encoding unit 300.

As mentioned above, prior to the encoding of the image encoding unit 300, the motion of the whole picture screen is detected by the global motion detecting unit 100. Since the detection result (motion vector 109) is used in the motion detecting unit 320 in the image encoding unit 300, it is sufficient that the motion detecting unit 320 in the image encoding unit 300 merely retrieves the narrower retrieved range 110 peripheral to the motion vector 109 and an amount of arithmetic operation for the motion detection can be reduced.

EMBODIMENT 2

In the embodiment 1, the case where the image of the present frame and the image of the reference frame are simultaneously inputted has been described. In the embodiment 2, the case where memories as much as a plurality of frames are provided and the present frame image and the reference frame image can be arbitrarily set will now be described.

Figure 4:
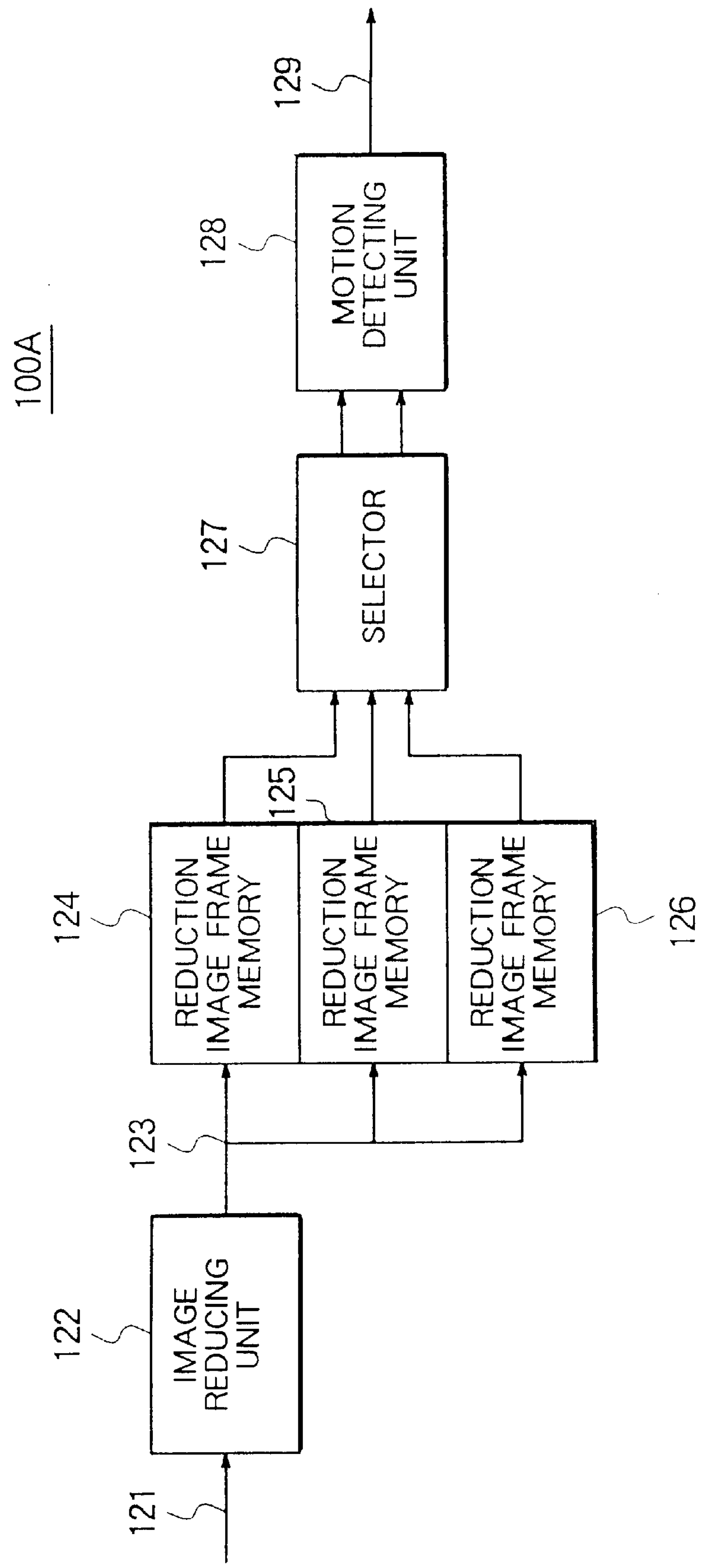
FIG. 4 is a block diagram showing a construction of a global motion detecting unit of an image encoding system according to an embodiment 2 of this invention.

The image encoding system according to the embodiment 2 of the present invention will be mentioned with reference to the drawings. FIG. 4 is a block diagram showing a construction of a global motion detecting unit of the image encoding system according to the embodiment 2 of this invention. An image encoding unit is the same as that of the above embodiment 1.

In FIG. 4, reference numeral 121 denotes input image data; 122 an image reducing unit; 123 reduction image data; 124 to 126 reduction image frame memories; 127 a selector; 128 a motion detecting unit; and 129 global motion information.

FIG. 4 is a block diagram showing a case of providing three frame memories of the reduction image. In this figure, the input image data 121 is inputted to the image reducing unit 122 and the reduction image data 123 is obtained. The reduction image data 123 is inputted to the reduction image frame memories 124, 125, and 126.

Here, it is assumed that the reduction image frame memories 124, 125, and 126 have a capacity of three frames, and for example, one frame as a present frame, one frame as a reference frame for a forward direction prediction, and one frame as a reference frame for a backward direction prediction are used, respectively.

The selector 127 selects two frames of the image data of the present frame and the image data of the reference frame from the three frames. The motion detecting unit 128 obtains the motion information 129 from the images of the two frames.

Similarly to the above embodiment 1, prior to the image encoding unit 300, a motion of the whole picture screen is detected by a global motion detecting unit 100A. The detection result is used by the motion detecting unit 320 in the image encoding unit 300. An amount of arithmetic operation by the motion detecting unit 320 in the image encoding unit 300, therefore, can be reduced. As compared with the embodiment 1, it is unnecessary to have a plurality of image reducing units and the amount of arithmetic operation can also be reduced.

EMBODIMENT 3

Although a method of reducing an image has not been described in the above embodiments, an example of a method of reducing the image will be mentioned in the embodiment 3. When the size of an image is set to be too large, effect for reduction of the arithmetic operation decreases. On the other hand, if the size of the image is set to be too small, a proper motion vector will not necessarily be obtained.

The image encoding system according to the embodiment 3 of this invention will be now described with reference to the drawings.

Figure 5:
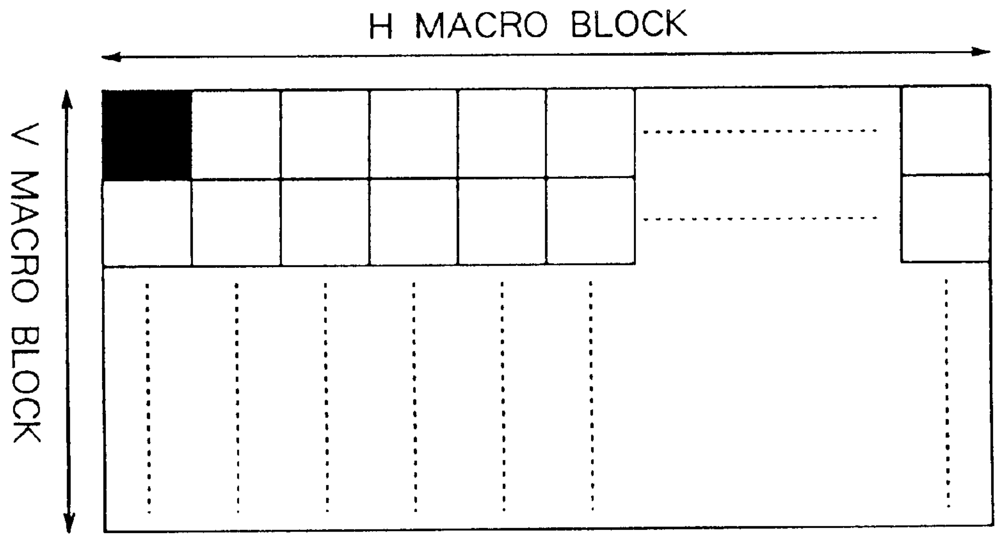
FIG. 5 is a diagram showing an image before an image reduction according to an image encoding system according to an embodiment 3 of this invention.

FIG. 5 shows an image before reduction, that is, the image (H×V macro blocks) having H macro blocks in the horizontal direction and V macro blocks in the vertical direction (H, V: integers). In this figure, one frame corresponds to one macro block (16 pixels×16 lines). If the image is reduced, the average value of 256 pixels of (1 block=16 pixels×16 lines), for instance, is obtained and the obtained average value is set to a value of one pixel of the reduction image.

Figure 6:
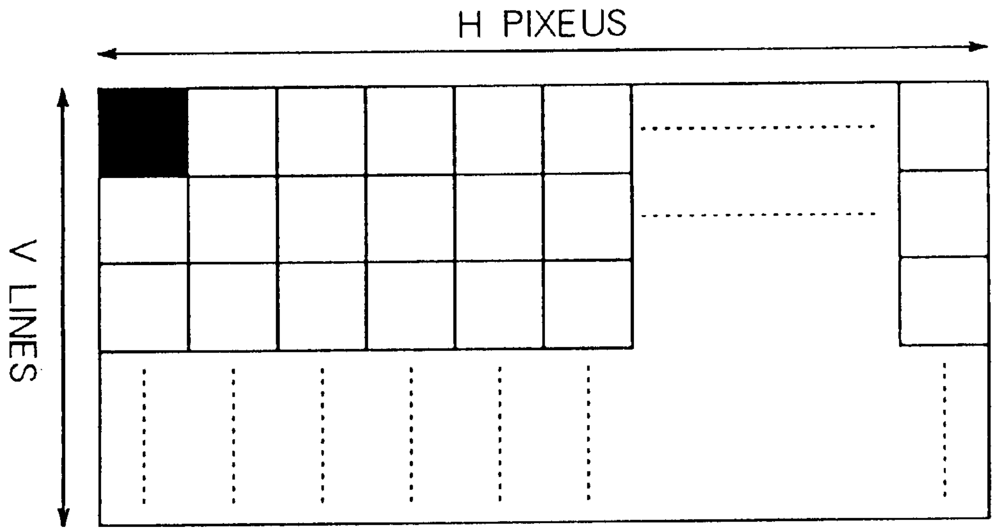
FIG. 6 is a diagram showing an image after the image reduction according to the image encoding system according to the embodiment 3 of this invention.

FIG. 6 shows an image after the image reduction, that is, the image (H×V pixels) comprising H pixels in the horizontal direction and V lines in the vertical direction. In FIG. 6, one frame corresponds to one pixel.

The case of reducing one macro block to one pixel has been mentioned above. It is sufficient that not only a reduction ratio is set to a further higher one but also the reduction ratio is inversely set to a lower one. It is not always necessary that the image is reduced by the same reduction ratio in the horizontal and vertical directions.

In a case of an interlaced image, with respect to an image having a large motion, there is a case where an image in the first field is extremely different from an image in the second field on a macro block unit basis. In this case, a motion can be detected more accurately by a method of forming a reduction image by using only either the first field or the second field than by a method of forming a reduction image by using both of the first field and the second field. For example, an average value of (16 pixels×8 lines) of the first field or (16 pixels×8 lines) of the second field is set to a value of one pixel of the reduction image. The case where one macro block is reduced to one pixel has been described above. It is sufficient that the reduction ratio is set to a much higher one and, inversely, to a lower one. It is not always necessary that the image is reduced by the same reduction ratio in the horizontal and vertical directions.

If the reduction image is formed by the above method, the whole motion can be detected by an amount of arithmetic operation which is not so large. With regard to an image having a large motion as well, the reduction image is formed by using the image in only either the first field or the second field, thereby enabling a motion to be detected accurately.

EMBODIMENT 4

Although only the global motion information has been obtained by the global motion detecting unit in the above embodiments, an example of obtaining local motion information will also be described in the embodiment 4.

Figure 7:
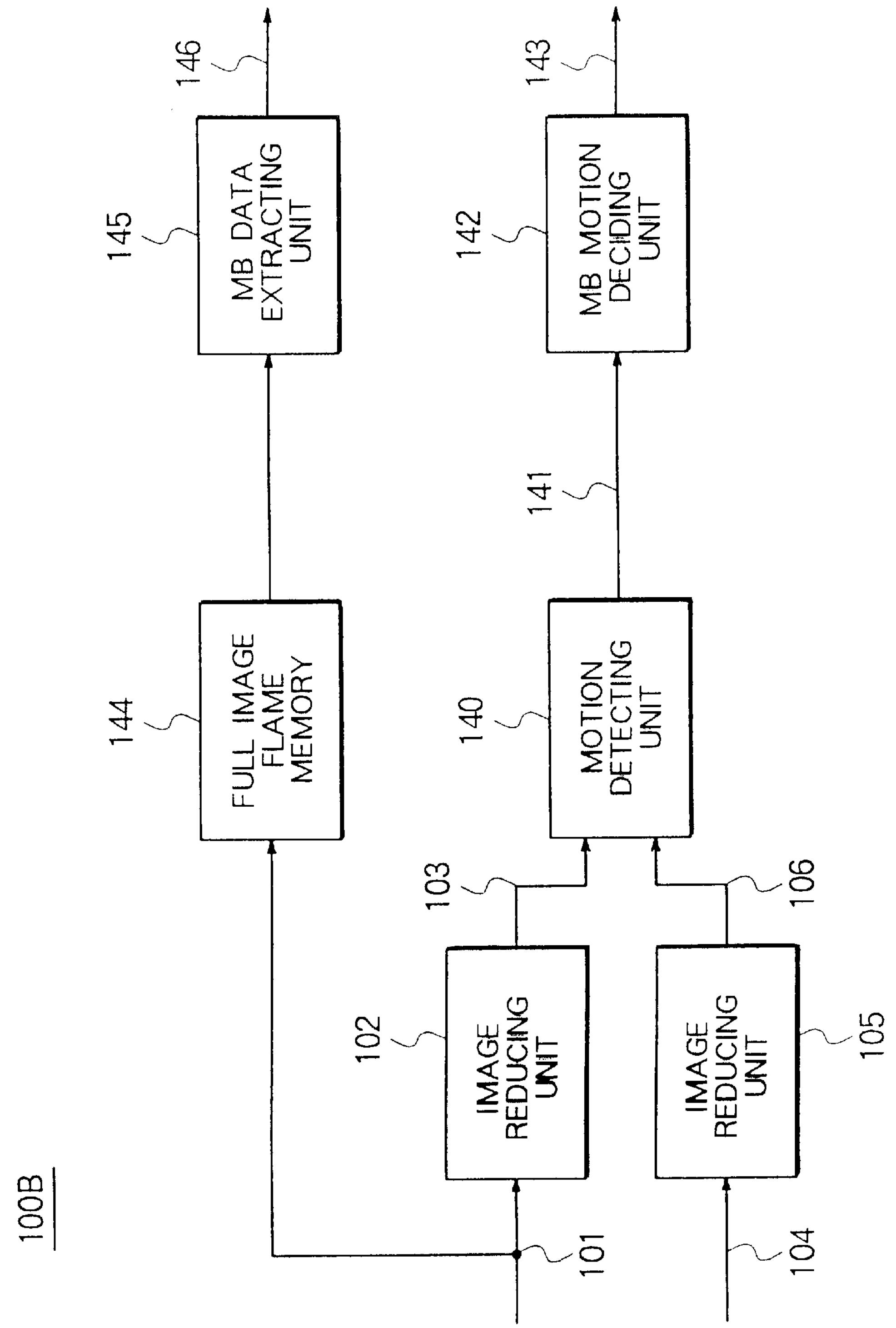
FIG. 7 is a block diagram showing a construction of a global motion detecting unit of an image encoding system according to an embodiment 4 of this invention.

An image encoding system according to the embodiment 4 of this invention will be mentioned with reference to the drawings. FIG. 7 is a block diagram showing a construction of a global motion detecting unit of the image encoding system according to the embodiment 4 of this invention. An image encoding unit is the same as one of the above embodiment 1.

In FIG. 7, reference numeral 100B denotes a global motion detecting unit; 101 image data of the present frame; 102 an image reducing unit; 103 a reduction image of the present frame; 104 image data of the reference frame, for instance, which is obtained by using a frame memory (not shown); 105 an image reducing unit; and 106 a reduction image of the reference frame.

In this figure, reference numeral 140 denotes a motion detecting unit; 141 global motion information and local motion information; 142 a macro block motion deciding unit (MB motion deciding unit); 143 macro block motion information; 144 a full image frame memory; 145 a macro block data extracting unit (MB data extracting unit); and 146 macro block data.

In FIG. 7, the image data 101 of the present frame is inputted to the image reducing unit 102 and the reduction image 103 of the present frame is obtained. In a similar manner, the data 104 of the reference frame is inputted to the image reducing unit 105 and the reduction image 106 of the reference frame is obtained.

Subsequently, in the motion detecting unit 140, the global motion information of the whole picture screen and local motion information of the partial picture screen 141 are obtained by the reduction image 103 of the present frame and the reduction image 106 of the reference frame. In the macro block motion deciding unit 142, the optimum motion information in the present macro block is selected from the obtained global motion information and local motion information 141. The macro block motion deciding unit 142 notifies the motion detecting unit 320 in the image encoding unit 300 of the selected information as macro block motion information 143.

In consideration of connecting to the image encoding unit 300, since processes are executed on a macro block unit basis in the image encoding unit 300, the macro block data 146 which is synchronous with the macro block motion information 143 is transmitted together in the global motion detecting unit 100B.

That is, in FIG. 7, the image data of the present frame 101 is inputted to the full image frame memory 144. Subsequently, in the macro block data extracting unit 145, the data of the specific macro block corresponding to the macro block motion information 143 is extracted from data inputted in the full image frame memory 144 and transmitted to the input terminal 301 in the image encoding unit 300 as macro block data 146.

Figure 8:
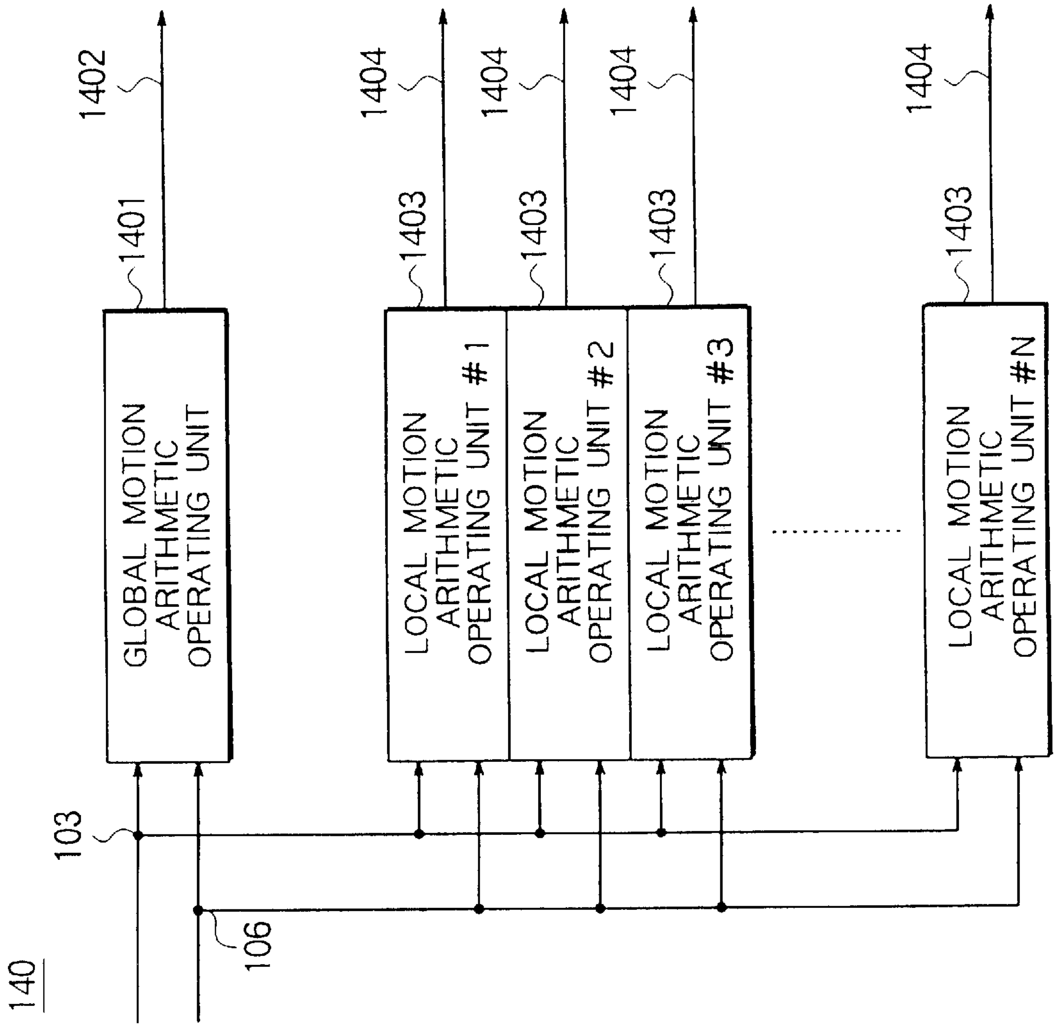
FIG. 8 is a block diagram showing a construction of a motion detecting unit in the global motion detecting unit of the image encoding system according to the embodiment 4 of this invention.

FIG. 8 is a block diagram showing a construction of the motion detecting unit 140 which obtains the global motion information and local motion information.

In FIG. 8, reference numeral 140 denotes a motion detecting unit; 1401 a global motion arithmetic operating unit; 1402 global motion information; 1403 local arithmetic operating units; and 1404 local motion information.

In the global motion arithmetic operating unit 1401, the motion of the whole reduction image is obtained on the basis of the reduction image data 103 of the present frame image and the reduction image data 106 of the reference frame image and is outputted as global motion information 1402. In the local arithmetic operating units 1403, the motion of the partial reduction image is obtained on the basis of the reduction image data 103 of the present frame image and the reduction image data 106 of the reference frame image and is outputted as local motion information 1404. The local motion arithmetic operating units 1403 as much as the number of the divisions of the picture screen are needed.

The motion information such as global motion information or local motion information which is used here indicates information as much as at least one set or more from the set of a small evaluation value, in which each set comprises an evaluation value such as a differential absolute value sum between two frames or the like and a motion vector value.

Figure 9:
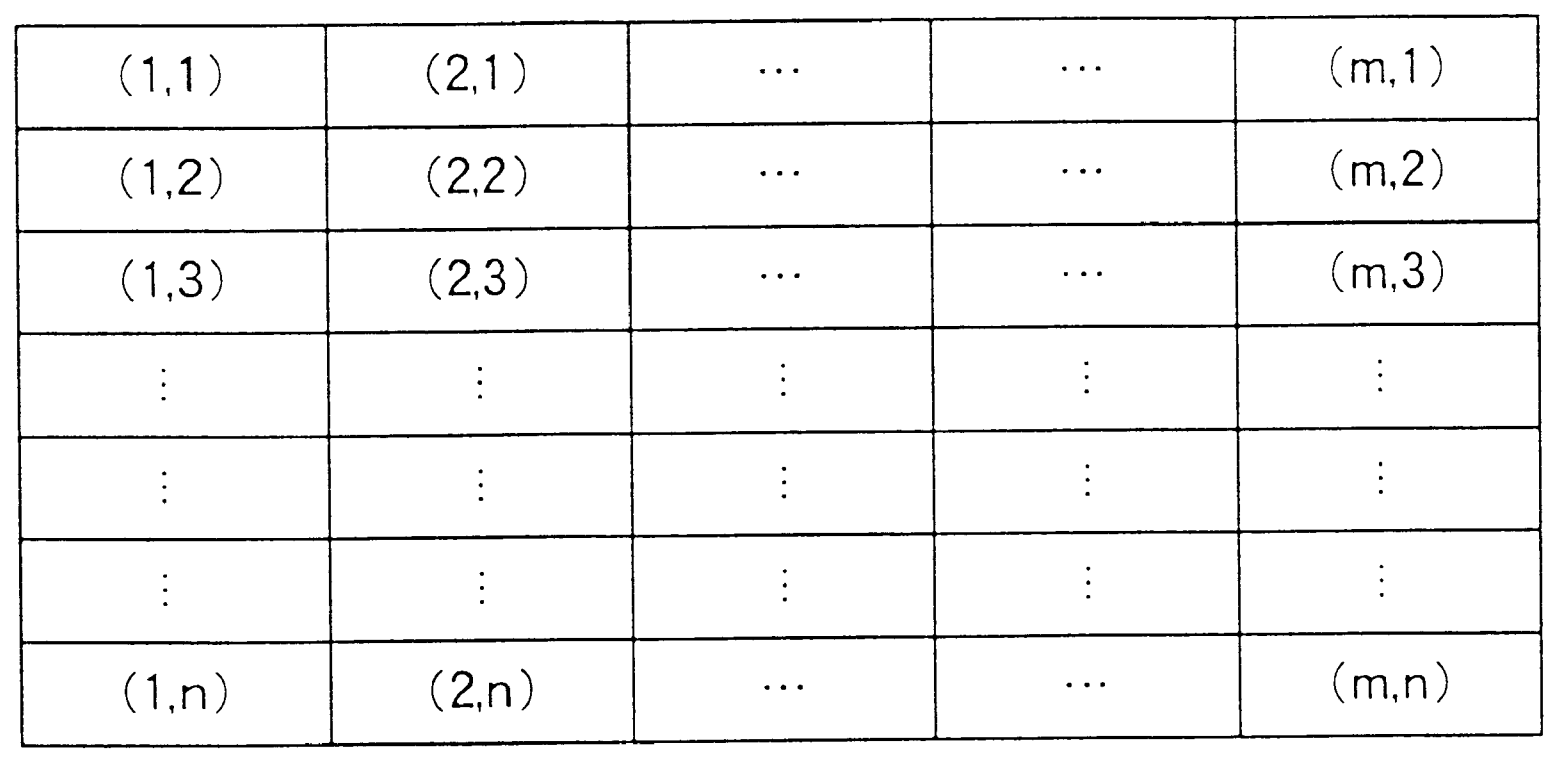

FIG. 9 shows an example of the picture screen division in the reduction image having H pixels in the horizontal direction and V lines in the vertical direction (H, V: integers) which is divided by "m" in the horizontal direction and by "n" in the vertical direction (m, n: integers). In case of this example, the (m×n) local motion arithmetic operating units 1403 are needed. It is not always necessary to divide into the same area, respectively. If it is unnecessary to obtain a motion with regard to a specific portion, the local motion detection regarding the portion has not to be executed as well.

As mentioned above, the local motion arithmetic operating units 1403 are provided for the motion detecting unit 140, so that a motion which also traces the local motion of the image such as a movement of an automobile can be detected.

The macro block motion information 143 and macro block data 146 are synchronized and transmitted to the image encoding unit 300. Consequently, even in the case where processes in the image encoding unit 300 are realized in one chip, an effective motion compensation prediction is performed in the image encoding unit 300 as it is.

EMBODIMENT 5

In the embodiment 4, an example of obtaining the local motion information has also been described in the case of simultaneously inputting the image of the present frame and the image of the reference frame. In the embodiment 5, however, an example of obtaining the local motion information will be described in the case where memories as much as a plurality of frame are provided and the present frame image and the reference frame image can arbitrarily be set.

Figure 10:
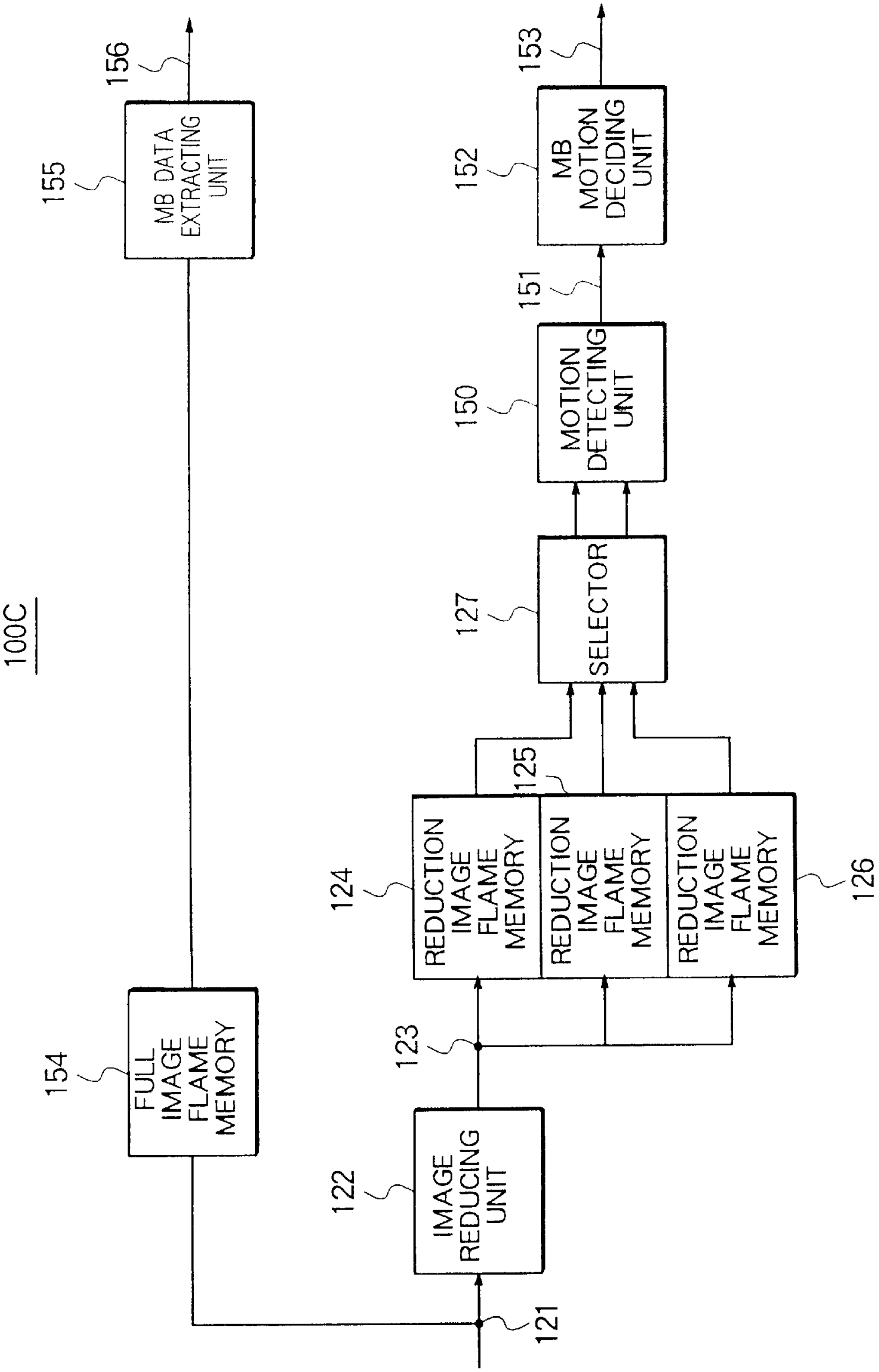
FIG. 10 is a block diagram showing a construction of a global motion detecting unit of an image encoding system according to the embodiment 5 of this invention.

The image encoding system according to the embodiment 5 will be mentioned with reference to the drawing. FIG. 10 is a block diagram showing a construction of a global motion detecting unit of the image encoding system according to the embodiment 5 of the present invention. An image encoding unit is the same as that of the embodiment 1.

In FIG. 10, reference numeral 121 denotes input image data; 122 an image reducing unit; 123 reduction image data; 124, 125, and 126 reduction image frame memories; and 127 a selector.

In figure, reference numeral 150 denotes a motion detecting unit; 151 global motion information and local motion information; 152 a macro block motion deciding unit (MB motion deciding unit); 153 macro block motion information; 154 a full image frame memory; 155 a macro block data extracting unit (MB data extracting unit); and 156 macro block data.

The motion detecting unit 150 to the macro block data 156 are similar to the motion detecting unit 140 to the macro block data 146 in the embodiment 4.

FIG. 10 shows a case of providing three frame memories of the reduction image. In this figure, the input image data 121 is inputted to the image reducing unit 122 and the reduction image 123 is obtained. The reduction image 123 is inputted to the reduction image frame memory.

The reduction image frame memories 124 to 126 have a capacity of 3 frames. For example, it is assumed that one frame as a present frame, one frame as a reference frame for a forward direction prediction, and one frame as a reference frame for a backward direction prediction are used, respectively.

Subsequently, the selector 127 selects two frames of the image of the present frame and the image of the reference frame out of them. From these images, the global motion information of the whole picture screen and local motion information of the partial picture screen 151 are obtained in the motion detecting unit 150.

In the macro block motion deciding unit 152, the optimum proper motion information is selected in the present macro block from the obtained global motion information and local motion information 151 and notified to the motion detecting unit 320 in the image encoding unit 300 as macro block motion information 153.

In consideration of connecting to the image encoding unit 300, the process is performed on a macro block unit basis in the image encoding unit 300, so that the encoded data synchronous with the motion information is transmitted together in a global motion detecting unit 100C.

That is, in FIG. 10, the input image data 121 is inputted to the full image frame memory 154. In the macro block data extracting unit 155, the specific macro block data corresponding to the macro block motion information 153 is extracted from the data in the full image frame memory 154 and is transmitted to the input terminal 301 in the image encoding unit 300 as macro block data 156.

As mentioned above, the local motion arithmetic operating unit is provided for the motion detecting unit 150, so that a motion which also traces the local motion of the image such as a movement of an automobile can be detected.

The macro block motion information 153 and macro block data 156 are synchronized and transmitted to the image encoding unit 300. Consequently, even in the case where processes in the image encoding unit 300 are realized in one chip, an effective motion compensation prediction is performed in the image encoding unit 300 as it is.

Further, as compared with the embodiment 4, it is unnecessary to provide a plurality of image reducing units and an amount of arithmetic operation can also be reduced.

INDUSTRIAL APPLICABILITY

An image encoding system according to the present invention, as mentioned above, comprises: a global motion detecting unit for detecting a motion of the whole picture screen between a reduction image of a present frame and a reduction image of a reference frame and for outputting global motion information; and an image encoding unit for performing a motion detection within a peripheral narrow retrieving range on the basis of the global motion information and for performing an encoding process of an image by using a motion compensation prediction. Therefore, it is effective in enabling an amount of arithmetic operation to be reduced in the motion detection of the image encoding unit.

In an image encoding system according to the present invention, as mentioned above, the global motion detecting unit comprises: a first image reducing unit for reducing an image of the present frame; a second image reducing unit for reducing an image of the reference frame; and a motion detecting unit for performing a global motion detection between the reduction image of the present frame and the reduction image of the reference frame. Therefore, it is effective in enabling the amount of arithmetic operation to be reduced in the motion detection of the image encoding unit.

In an image encoding system according to the present invention, as mentioned above, the first and second image reducing units filter an image of "a" pixels in the horizontal direction and "b" lines in the vertical direction (a, b: integers), perform a sub-sampling after that, and form data of one pixel, thereby performing an image reduction. Therefore, by reducing an image having, for instance, about one macro block to one pixel, it is effective in enabling a proper motion to be obtained without increasing so much the amount of arithmetic operation in the global motion detecting unit.

Moreover, in an image encoding system according to the present invention, as mentioned above, the motion detecting unit performs the global motion detection, detects a partial motion of the picture screen between the reduction image of the present frame and the reduction image of the reference image, and outputs local motion information, and the global motion detecting unit further has a macro block motion deciding unit for selecting optimum motion information in a present macro block from the detected global motion information and the detected local motion information and for outputting the selected information to the image encoding unit as macro block motion information. Therefore, it is effective in enabling the optimum motion to be obtained with respect to the local motion of the image.

In an image encoding system according to the present invention, as mentioned above, the global motion detecting unit comprises: an image reducing unit for reducing an input image; a reduction image frame memory for storing the reduced image as much as at least two or more frames; a selector for extracting the reduction image of the present frame and the reduction image of the reference frame out of the reduction images stored in the reduction image frame memory; and a motion detecting unit for performing a global motion detection between the reduction image of the present frame and the reduction image of the reference frame. Therefore, it is unnecessary to provide a plurality of image reducing units and further, it is effective in enabling the amount of arithmetic operation to be reduced.

In an image encoding system according to the present invention, as mentioned above, the image reducing unit filters an image of "a" pixels in the horizontal direction and "b" lines in the vertical direction (a, b: integers), performs a sub-sampling after that, and forms data of one pixel, thereby performing an image reduction. Therefore, by reducing an image having, for instance, about one macro block to one pixel, it is effective in enabling a proper motion to be obtained without increasing so much the amount of arithmetic operation in the global motion detecting unit.

Moreover, in an image encoding system according to the present invention, as mentioned above, the motion detecting unit performs the global motion detection, detects a partial motion of the picture screen between the reduction image of the present frame and the reduction image of the reference image, and outputs local motion information, and the global motion detecting unit further has a macro block motion deciding unit for selecting optimum motion information in a present macro block from the detected global motion information and the detected local motion information and for outputting the selected information to the image encoding unit as macro block motion information. Therefore, it is effective in enabling an optimum motion to be obtained with respect to the local motion of the image as well.

What is claimed is:

1. An image encoding system comprising:

a global motion detecting unit for detecting a motion of a whole picture screen between a reduction image of a present frame and a reduction image of a reference frame and for outputting global motion information; and an image encoding unit for receiving said global information as an input and in response, the image encoding unit to perform motion detection within a peripheral narrow retrieving range and to perform an encoding process of an image by using a motion compensation prediction.

2. An image encoding system according to claim 1, wherein said global motion detecting unit comprises:

a first image reducing unit for reducing an image of the present frame;

a second image reducing unit for reducing an image of the reference frame; and a motion detecting unit for performing a global motion detection between the reduction image of said present frame and the reduction image of said reference frame.

3. An image encoding system according to claim 2, wherein said first and second image reducing units filter an image of "a" pixels in the horizontal direction and "b" lines in the vertical direction (a, b: integers), perform a sub-sampling after that, and form data of one pixel, thereby performing an image reduction.

4. An image encoding system according to claim 1, wherein said global motion detecting unit comprises:

an image reducing unit for reducing an input image;

a reduction image frame memory for storing said reduced image as much as at least two or more frames;

a selector for extracting the reduction image of the present frame and the reduction image of the reference frame out of said reduction images stored in said reduction image frame memory; and a motion detecting unit for performing a global motion detection between said reduction image of said present frame and said reduction image of said reference frame.

5. An image encoding system according to claim 4, wherein said image reducing unit filters an image of "a" pixels in the horizontal direction and "b" lines in the vertical direction (a, b: integers), performs a sub-sampling after that, and forms data of one pixel, thereby performing an image reduction.

6. An image encoding system according to claim 5, wherein said motion detecting unit performs said global motion detection, detects a partial motion of the picture screen between said reduction image of said present frame and said reduction image of said reference image, and outputs local motion information, and said global motion detecting unit further has a macro block motion deciding unit for selecting optimum motion information in a present macro block from said detected global motion information and said detected local motion information and for outputting the selected information to said image encoding unit as macro block motion information.

7. An image encoding system, comprising:

a global motion detecting unit for detecting motion of a whole picture screen between a reduction image of a present frame and a reduction image of a reference frame and for outputting global motion information; and an image encoding unit for performing motion detection within a peripheral narrow retrieving range on the basis of said global motion information and a single set of reduced image data, and for performing an encoding process of an image by using a motion compensation prediction.

8. The image encoding system of claim 7, wherein:

said global motion detecting unit to detect partial motion of the picture screen between said reduction image of said present frame and said reduction image of said reference image, and to output local motion information; and said global motion detecting unit including a macro block motion deciding unit for selecting optimum motion information in a present macro block from said detected global motion information and said detected local motion information, and for outputting the selected information to said image encoding unit as macro block motion information.

9. A two-stage image encoding system, comprising:

a first stage, comprising:

a global motion detecting unit for detecting motion of a whole picture screen between a reduction image of a present frame and a reduction image of a reference frame and for outputting global motion information; and a second stage, comprising:

an image encoding unit for receiving said global information as an input and in response, the image encoding unit to perform motion detection within a peripheral narrow retrieving range and to perform an encoding process of an image by using a motion compensation prediction.

10. A method for encoding an image, comprising:

detecting global motion between a reduction image of a present frame and a reduction image of a reference frame to output global motion information;

receiving said global motion information as an input; and in response to said receiving, performing motion detection within a peripheral narrow retrieving range and performing an encoding process of an image by using a motion.

11. The method of claim 10, wherein said detecting further includes:

reducing an image of the present frame; and reducing an image of the reference frame.

12. The method of claim 10, wherein said detecting further includes:

reducing an input image;

storing said reduced image as at least two or more frames; and selecting and extracting the reduction image of the present frame and the reduction image of the reference frame out of said stored reduction images.

13. A method for encoding images, comprising:

detecting motion of a whole picture screen between a reduction image of a present frame and a reduction image of a reference frame and for outputting global motion information;

performing motion detection within a peripheral narrow retrieving range on the basis of said global motion information and a single set of reduced image data; and in response to said performing, performing an encoding process of an image by using a motion compensation prediction.

14. The method of claim 13, wherein said detecting includes:

detecting partial motion of the picture screen between said reduction image of said present frame and said reduction image of said reference image to output local motion information; and selecting optimum motion information in a present macro block from said detected global motion information and said detected local motion information to output the selected information as macro block motion information to initiate said performing an encoding process.

* * * * *